(12) United States Patent
Sarrant-Foresti et al.

(10) Patent No.: US 8,547,640 B2
(45) Date of Patent: Oct. 1, 2013

(54) GRATING COMPRISING SUB-GRATINGS WITH LIGHT-DIFFUSING PATTERNS

(75) Inventors: Maud Sarrant-Foresti, Suresnes (FR); Guillaume Lecamp, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 232 days.

(21) Appl. No.: 13/127,478

(22) PCT Filed: Oct. 29, 2009

(86) PCT No.: PCT/FR2009/052092
§ 371 (c)(1),
(2), (4) Date: Jul. 5, 2011

(87) PCT Pub. No.: WO2010/052411
PCT Pub. Date: May 14, 2010

(65) Prior Publication Data
US 2011/0255168 A1    Oct. 20, 2011

(30) Foreign Application Priority Data
Nov. 4, 2008    (FR) .................................... 08 57493

(51) Int. Cl.
*G02B 5/02*    (2006.01)
(52) U.S. Cl.
USPC .......................................... 359/599; 359/569

(58) Field of Classification Search
None
See application file for complete search history.

(56) References Cited

U.S. PATENT DOCUMENTS

| 5,009,484 | A | 4/1991 | Gerritsen | |
| 5,413,884 | A * | 5/1995 | Koch et al. | 430/5 |
| 6,057,082 | A | 5/2000 | Korth | |
| 2003/0231395 | A1 | 12/2003 | Nakai | |
| 2004/0218275 | A1 * | 11/2004 | Ketterson et al. | 359/575 |
| 2005/0231804 | A1 * | 10/2005 | Mossberg et al. | 359/563 |
| 2010/0128349 | A1 * | 5/2010 | Menez et al. | 359/592 |
| 2010/0177394 | A1 * | 7/2010 | Guering et al. | 359/592 |

OTHER PUBLICATIONS

International Search Report issued Feb. 19, 2010 in PCT/FR09/52092 filed Oct. 29, 2009.

* cited by examiner

*Primary Examiner* — Arnel C Lavarias
*Assistant Examiner* — Jyotsna Dabbi
(74) *Attorney, Agent, or Firm* — Oblon, Spivak, McClelland, Maier & Neustadt, L.L.P.

(57) ABSTRACT

A transparent substrate including at its surface a grating of parallel lines of patterns separated by zones with a refractive index different from that of the patterns, the grating diffusing light and including at least 4 sub-gratings, each sub-grating including plural blocks of identical patterns with a width, each block including 2 to 10 of the patterns. Centers of gravity of neighboring patterns inside a block are separated by a constant period, the distance between neighboring blocks vary in a non-monotonic manner when passing from one edge of the sub-grating to the other edge of the sub-grating.

15 Claims, 2 Drawing Sheets

GRATING COMPRISING SUB-GRATINGS WITH LIGHT-DIFFUSING PATTERNS

Figure 1:
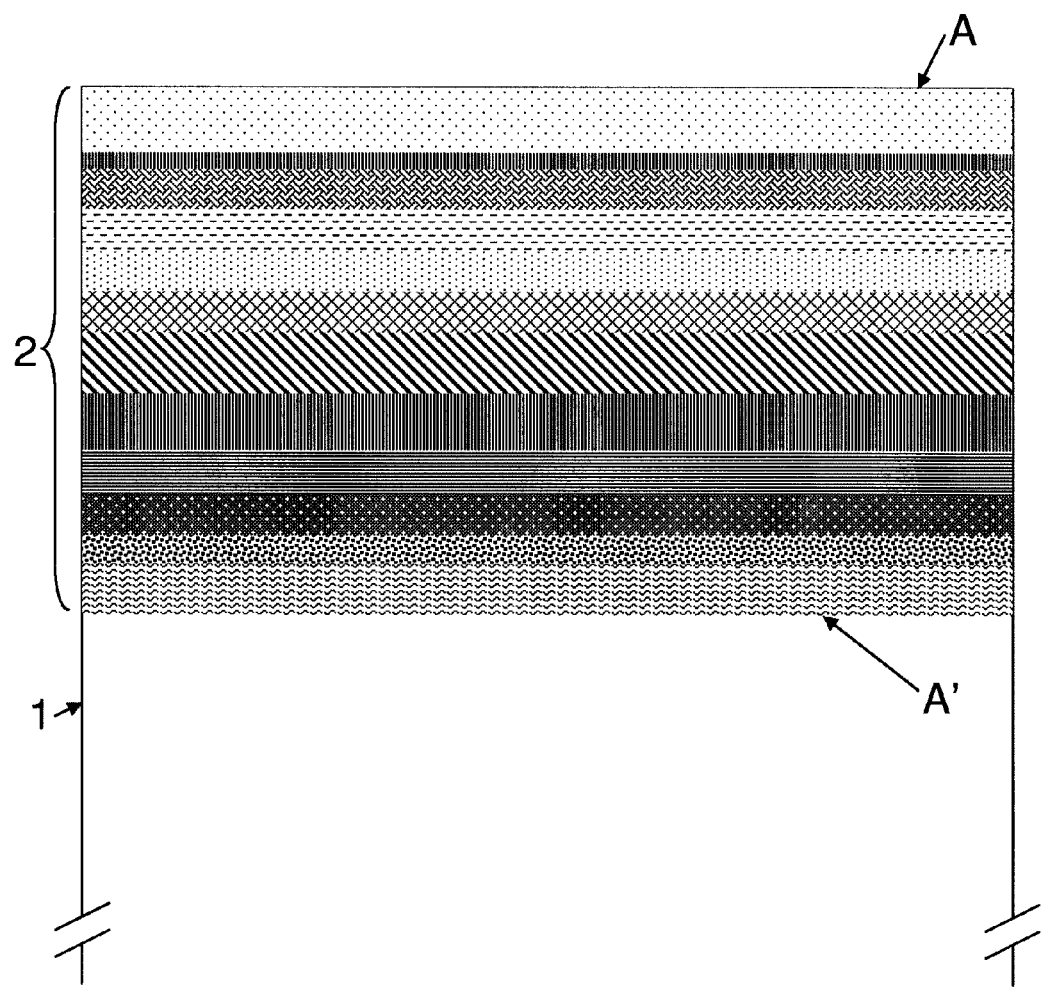

The invention relates to the field of glazing for buildings comprising elements capable of redirecting light coming from the outside in a desired direction inside, generally to the ceiling. This type of glazing is generally referred to as "daylighting" when it is visible sunlight that it is desired to deflect.

This type of glazing is generally considered as contributing to energy saving on account of the fact that external light is used more effectively indoors, which makes it possible to reduce artificial lighting.

U.S. Pat. No. 5,009,484 teaches glazing comprising a diffraction grating on its surface consisting of raised parallel lines. This document teaches that the grating usually leads to light diffraction resulting in separation of colors. This effect is not necessarily desired. In order to limit the extent of this phenomenon, this document recommends (see its FIG. 3) to juxtapose three successive gratings vertically for each of the three fundamental colors, the emerging beams of these three colors having to be mixed once again at the ceiling to reform a colorless illuminated zone. The three successive gratings have different periodicities, varying in a monotonic manner according to a precise order. This document also teaches that these three successive gratings may be replaced by a single grating of which the periodicity changes in a monotonic manner from one end to the other of this single grating. The solutions taught by this patent work to a small extent but do not prevent all formation of iridescence. Moreover, in this document, the diffusing patterns are inclined, possibly variable, and have a variable depth, which makes it very difficult to produce them industrially over a large area at low cost.

Patent application PCT/FR2008/050677 teaches a transparent substrate having at its surface a grating of lines with at least 200 light-diffusing patterns, said patterns being separated by zones with a refractive index different from that of the patterns, the distance d between the centers of gravity of neighboring patterns varying in a non-monotonic manner from one edge of the grating to the other, so that for any group of 50 successive patterns, the distance d between the centers of gravity of neighboring patterns of said group is at least once greater and at least once less than the mean distance dm of distances d between centers of gravity of neighboring patterns of said group, dm lying between 75 nm and 200 µm. This substrate is transparent in direct vision and redirects light while diffusing it with little iridescence effect in a daylighting application.

Patent application PCT/FR2008/050678 teaches a transparent substrate having at its surface a light-diffusing assembly comprising at least 10 juxtaposed sub-gratings of parallel lines of patterns, said patterns being separated by zones with a refractive index different from that of the patterns, each sub-grating comprising at least 20 successive identical patterns repeated at an equal distance with a period p, said period varying in a non-monotonic manner from one edge of the assembly of the sub-gratings to the other. This substrate redirects light with little iridescence in a daylighting application.

Although both aforementioned international applications already obtain a notable improvement by reducing the iridescence effect obtained with a grating, the present application provides a still further reduction in iridescence, that is to say the appearance of colors in the region of the projected light (generally to the ceiling).

The present invention relates to a surface grating limiting the apparent separation of various colors of the light and leading to lighting with substantially the same coloration as the incident light, without pronounced apparent iridescence of the deflected light (generally on the ceiling). Thus, if the incident light is substantially colorless to the naked eye, this emerging light is also colorless. It is desired that light is deflected with a single order of the grating (generally of the order 1 of the grating) since otherwise this would produce various separate lighting zones (to the ceiling if light is projected to the ceiling), some of which would not be judiciously placed and moreover this could be unattractive.

The substrate according to the invention is transparent, which means that it is possible to see clearly through it and this whatever the angle of vision for the observer. Part of the light is redirected (that is to say deflected) by the substrate. The grating diffuses the light that it deflects. If the angle of incidence of the light is defined as being the angle between the perpendicular to the substrate and the direction of the light, the redirected light is 10 to 50% of the total transmitted light (passing through the substrate), in particular for light with an angle of incidence greater than 30°. Thus, the invention exhibits greater usefulness for equipping glazing (disposed vertically) for premises situated at terrestrial latitudes such that the sun's rays may form an angle of incidence with the horizontal greater than 30°, at least partially during the year.

According to the invention, there is created on the surface of a transparent substrate in a direction parallel to said surface a grating diffusing light comprising sub-gratings of parallel lines of patterns, said sub-gratings being disposed in the same plane, beside each other or even in a juxtaposed manner, so that all the lines of the patterns of the grating are parallel to each other.

The transparent substrate according to the invention has, at its surface, a grating of parallel lines of a pattern separated by zones with a refractive index different from that of the patterns, said grating diffusing light and comprising at least 4 sub-gratings, each sub-grating comprising parallel lines of patterns, said patterns being separated by zones with a refractive index different from that of the patterns, each of said sub-gratings comprising a plurality (which means at least 2) of blocks of identical patterns with a width L, each block comprising 2 to 10 of said patterns, the centers of gravity of neighboring patterns inside a block being separated by a constant period p for the block considered and characteristic of the sub-grating considered, the distance Db between neighboring blocks varying in a non-monotonic manner when passing from one edge of the sub-grating to the other edge of the same sub-grating, while being greater than 0 times L and less than 20 times L, and so that it is at least once greater than 1.2 $Db_m$ and at least once less than 0.7 $Db_m$, $Db_m$ being the arithmetic mean of distances between blocks of the sub-grating and the period p varying from one sub-grating to another in a non-monotonic manner between 0.5 $p_m$ and 1.5 $p_m$ when passing from one edge of the grating to the other, $p_m$ being the arithmetic mean of periods p characteristic of the sub-gratings, and so that at least one sub-grating has a period greater than 1.2 $p_m$ and that at least one sub-grating has a period less than 0.8 $p_m$. A sub-grating according to the invention necessarily contains blocks within the meaning given above.

If the grating according to invention is traversed from one of its edges to the other, a first sub-grating with a block starts at the beginning of first pattern of its first block (which also corresponds to the start of the first block) and finishes at the end of the last pattern of its last block (which also corresponds to the end of the last block). It is possible to have patterns that do not belong to a block between two blocks of the same sub-grating. However, at least 80% and preferably at least 90% and even 100% of the patterns of a sub-grating form part of the blocks. Preferably, at least 80% and preferably at least 90% and even 100% of the patterns of the grating according to the invention form part of the blocks (and thus also of the sub-gratings). Each sub-grating contains at least 4 blocks and preferably 100 to 5000 blocks. It is possible to have patterns that do not belong to a sub-grating between each sub-grating of the grating according to the invention. However, at least 80% and preferably at least 90% and even 100% of the patterns of the grating according to the invention form part of the sub-gratings. The sub-gratings may be spaced by zones without patterns. However, in the grating according to the invention, two neighboring patterns (belonging or not to a block, belonging or not to a sub-grating) are separated (from center of gravity to center of gravity) by less than 20 times and by less than 5 times the width of the widest pattern of these neighboring patterns.

The grating according to the invention generally comprises more than 10 sub-gratings. It generally comprises less than 1000 sub-grating.

From one edge of the other of the grating, the period p characteristic of the sub-gratings varies in a non-monotonic manner. In absolute values, this period p lies between 100 nm and 20 μm. It varies inside the zone between 0.5 $p_m$ and 1.5 $p_m$, $p_m$ being the arithmetic mean of periods p characteristic of the sub-grating. It varies in a non-monotonic manner so that at least one sub-grating has a period greater than or equal to 1.2 $p_m$ and that at least one sub-grating has a period less than 0.8 $p_m$. The term "non-monotonic" signifies that this period does more than increase or decrease when going from one edge of the grating to the other. On the contrary, this distance p alternates from the highest values to the lowest values when passing from one edge of the grating to the other. Preferably, more than 25% of the sub-gratings have a period p greater than 1.2 $p_m$. Preferably, more than 25% of the sub-gratings have a period p less than 0.8 $p_m$.

Within the context of the present application, the concept of diffusion applies to deflected light and concerns the entire grating, including all sub-gratings.

According to the invention, a grating is created on the surface of a transparent substrate and in a direction parallel to said surface, comprising an alternation of at least two refractive indices R1 and R2 by elementary linear patterns of index R1 separated by linear elementary zones with index R2, said patterns and zones being geometrically complementary to each other. The patterns and zones are geometrically complementary since they are intertwined. This is why only the definition of the geometry of the patterns with index R1 is sufficient since the zones with index R2 fill all the space situated between the patterns. The geometry of the patterns is notably defined by their width L parallel to the substrate, by the distance between centers of gravity of neighboring patterns and by their depth h.

According to the invention, the grating contains a multiplicity of sub-gratings with parallel patterns at least 4 in number, (this parallelism applying to patterns within a sub-grating but also from one sub-grating to the other). The various sub-gratings are placed in the grating so as to be dispersed relative to periodicity in order to mix the various emergent radiations and to arrive more successfully at neutral illumination without particular coloration.

Figure 3:
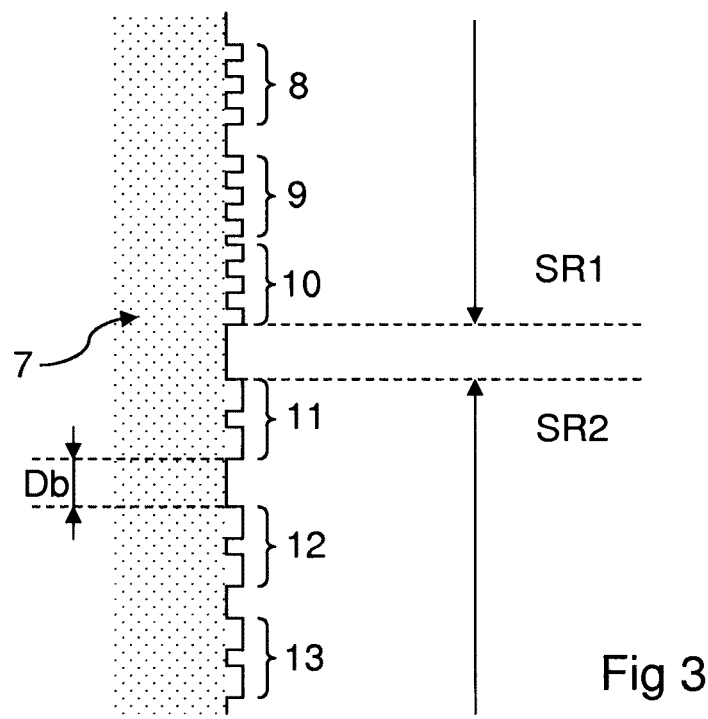

The distance between neighboring blocks is understood to mean the distance between the last pattern of one of the blocks and the first pattern of another block (see Db on FIG. 3). According to the invention, the distance between neighboring blocks inside a sub-grating varies in a non-monotonic manner while being greater than 0 times L and less than 20 times L, L being the width of a block of patterns, and so that it is at least once greater than 1.2 $Db_m$ and at least once less than 0.7 $Db_m$, $Db_m$ being the arithmetic mean of the distances between blocks of the sub-grating. Preferably, more than 25% of the distances between neighboring blocks are greater than 1.2 $Db_m$. Preferably, more than 25% of the distances between neighboring blocks are less than 0.7 $Db_m$.

In a sub-grating, identical juxtaposed patterns form blocks of 2 to 10 patterns and preferably 2 to 5 patterns. A block is characterized by an identical distance between patterns, counting from the one center of gravity to another center of gravity. When starting from a block, as soon as distance between patterns changes, that is when a block is left. Preferably, at least 80% and even at least 90% and even 100% of patterns of the sub-grating form part of the blocks. A block comprises a minimum of two patterns and an interval between these two patterns. A block of n patterns contains n−1 intervals. A sub-grating contains at least 4 identical blocs.

Taking into account this concept of blocks, it may be said that the structure of the sub-grating is organized locally. The effect of this local organization and notably the constant character of the width L in a sub-grating and preferably in the entire network, is transparency without diffusion in direct vision. A transparent substrate is defined as being a substrate through which an object does not appear blurred.

The grating according to the invention generally comprises a total of more than 100,000 patterns, more generally more than 1,000,000 patterns.

The distance between neighboring patterns in a sub-grating is of the order of a wavelength of the radiation that it is desired to deflect.

It should be recalled that light radiations have substantially the following wavelengths.

Ultraviolet: 150 to 400 nm
Visible: 400 to 800 nm
Infrared: 800 nm to 100 μm

In all the grating according to the invention, the distance between neighboring patterns (which is equivalent to "between centers of gravity of neighboring patterns") is generally between 75 nm and 200 μm and more generally between 100 nm and 20 μm.

If it is visible light that it is desired to deflect, $p_m$ is preferably chosen within the range 200 to 600 nm and preferably in the range 300 to 500 nm. In order to deflect visible light, $p_m$ is preferably greater than or equal to 200 nm and even greater than or equal to 300 nm. In order to deflect visible light, $p_m$ is preferably less than or equal to 600 nm and even less than 500 nm and even more preferably less than or equal to 450 nm. If $p_m$ is too high, notably above 500 nm, the non-deflected transmitted light is less intense and, moreover, higher orders of the grating are made to appear, which means that the light is deflected in several places.

Although it is not excluded that they are inclined, the patterns are generally non-inclined (a person skilled in the art would say blazed), that is to say symmetrical with respect to the perpendicular to the substrate and passing through the center of gravity of the patterns.

The width L of the pattern is defined as being its width in the region of its center of gravity. The patterns are generally parallelepiped. In practice, there being no perfection in this world, these parallelepipeds may have their corners (concave and convex) more or less rounded. Preferably, L is constant or substantially constant for all the grating. However, L may vary about a mean value $L_m$ (arithmetic mean), this variation being less than 25% of $L_m$. The width L may thus vary between 0.75 $L_m$ and 1.25 $L_m$. The more L varies within the grating, the more this loses in transparency in direct vision. In general, L lies between 0.2 times the period P and 0.8 times the period p and preferably extends from 0.4 times the period p to 0.6 times the period p.

Generally, the depth h of patterns is constant for all the grating. Generally, the ratio between the width L and depth h of the patterns is chosen within the range extending from 0.2 to 5 and preferably from 0.4 to 2. Generally, the ratio between the width L and depth h of the patterns is constant for all the grating.

If a line parallel to the substrate is followed passing through the centers of gravity of the patterns, the refractive index R1 of the patterns and the refractive index R2 of the zones between patterns are passed successively. Notably, the patterns may be of glass and the zones may be air. This is the case when patterns are produced as glass protuberances from the surface of the glass substrate. The ambient air fills the space between the patterns and that naturally constitutes the zones. In this case, the index R1 is that of glass, for example 1.5 and the index R2 is that of air, namely 1. In this case (glass/air alternation), patterns are produced in relief on the surface of a substrate. The passage from a pattern to a zone may however correspond to a modification of the refractive index not corresponding to a portion in relief. Indeed, there may be two different intertwined materials so that the surface is smooth to touch. It is possible notably to produce such alternation of materials by ion exchange techniques or those based on a photorefractive and electro-optic effect.

All patterns in the same grating generally have the same refractive index and all the zones generally have the same refractive index. The refractive indices of patterns and zones may extend from 1 to 2.2. Generally, patterns may have their refractive index extend from 1.1 to 1.8. Generally, zones may have their refractive index extend from 1 to 1.5.

The difference between the two refractive indices (those of patterns and those of zones) may generally lie between 0.02 and 1.5.

In general, if the zones are air, the patterns have a refractive index greater than that of the zones.

Concerning essentially the fitting of glazing for buildings, materials are chosen constituting said glazing (substrate, possibly a part applied to said substrate) that has sufficient transparency. Notably, the grating according to the invention may be made on a plastic film (PET, PMMA, polycarbonate) by direct embossing. A thin layer, for example of acrylic, may also be embossed and applied to a PET film. The film is then adhered to a glass substrate or inserted between two glass sheets.

The glazing according to the invention is notably applied to daylighting. In this case, it is generally placed on vertical glazing so that the lines of patterns are horizontal. The grating generally occupies a height of at least 10 cm and more generally a height of at least 20 cm of glazing, generally over all the width of the glazing and generally in the upper part of the glazing.

The glazing according to the invention may generally be produced by the following techniques: embossing, photolithography, transfer, ion exchange, photorefractive effect of electro-optic effect.

A first method comprises the embossing of a sol-gel or polymer layer applied to a transparent sheet (substrate), notably made of glass. Embossing is plastic or viscoplastic deformation produced by contact with a structured element, consisting of a roller for example, and on which a pressure is simultaneously exerted. Sol-gel layers that may be used are generally liquid layers of a precursor of an inorganic oxide such as $SiO_2$, $Al_2O_3$, $TiO_2$, for example dissolved in a water-alcohol mixture. These layers harden on drying with or without auxiliary heating means. Mention may be made of an $SiO_2$ precursor, tetraethoxysilane (TEOS) or methyltriethoxysilane (MTEOS). Organic functional groups may be included in these precursors and the silica finally obtained. As an example, fluorinated silanes have been described in EP 799 873 for obtaining a hydrophobic coating. Embossing may also be produced on polymer layers such as polyethylene terephthalate (PET),
polystyrene,
polyacrylates such as polymethylmethacrylate, polybutylacrylate, polymethacrylic acid, poly 2-hydroxyethylmethacrylate and polymers thereof,
polyepoxy(meth)acrylates,
polyurethane(meth)acrylates,
polyimides such as polyethylglutarimide,
polysiloxanes such as polyepoxysiloxanes,
polyvinylethers,
polybisbenzocyclobutenes etc.
alone or in copolymers or mixtures of several of these.

Embossing may be followed in some cases by etching. The embossed sol-gel or polymer layer may be attacked until the material of the subjacent transparent sheet reappears, first of all in the deep parts of said relief patterns and then progressively to their upper parts. Thus, the more or less irregular surface obtained at the end of etching may be formed entirely in the sol-gel or polymer layer, or partly therein and partly in said transparent sheet or entirely in the latter. The etching conditions should be regulated so that this resulting surface has raised patterns with dimensions satisfying the definition of the device of the invention.

As etching methods, mention may be made of:
Chemical etching, notably by an acid,
Reactive Ion (Beam) Etching=RI(B)E,
Plasma etching (Inductively Coupled Plasma=ICP).

It should be noted that the embossing method makes it possible to treat relatively huge areas rapidly at moderate cost.

Another possible method for producing the grating according to the invention comprises photolithography. This method generally consists of first of all providing the transparent substrate with a first layer in which said relief patterns could be formed. This first layer is comparable to the applied sol-gel or polymer layer of the embossing method. It may also be of the same nature as this, notably made of silica. In a second step of the method, a second coat of a photosensitive resin is deposited. This is hardened in defined locations by exposure to targeted radiation. A mask is produced in this way, above the first layer to be etched, after removing the unhardened parts of the photosensitive resin. Etching is then carried out in the same way as described above relating to the alternative of the method by embossing. Any residues of the photosensitive resin may be removed.

Another method for producing the grating according to the invention comprises transferring a nanostructured layer. A layer adhered to a first support is made to adhere to a second, so as to constitute a device according to the invention. The layer may be made of a plastic or the like.

Another method that may be used relies on ion exchange, for example of $Na^+$ ions by $Ag^+$ ions in an inorganic glass.

Finally, a photorefractive effect may be used, according to which modulated light induces spatial modulation of the refractive index of the material (example: photorefractive crystal made of barium titanate). It is also possible to use an electro-optical effect according to which an electric field induces spatial modulation of the refractive index of the materials.

FIG. 1 shows glazing 1 made of an inorganic glass that may be mounted vertically in a window of a building. The upper part of the glazing 1 is provided with a grating 2 consisting of twelve sub-gratings according to the invention. The sub-gratings are represented by various graphic textures, which do not represent actual surface patterns. All the sub-gratings have the entire width of the glazing and their size varies in height. It will be seen that the sub-gratings are juxtaposed one on the other in the same plane on the surface of the glazing between the edge A of the grating and the edge A' of the grating. It consists of a purely qualitative representation in order to show the location of sub-gratings relative to each other and on the glazing 1.

Figure 2:
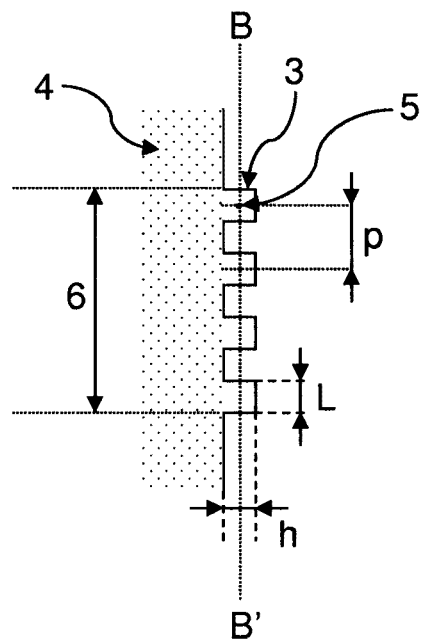

FIG. 2 shows a block of 4 patterns identical to the pattern 3 on the surface of a substrate 4 (seen in section perpendicular to the substrate and to the lines of patterns). The center of gravity of the patterns 3 is in 5. These patterns are of the parallelepiped type and have a width L and a depth h. The centers of gravity of neighboring patterns inside the block are separated by a constant distance p. The block has a width indicated by 6. If a line BB' is followed parallel to the substrate passing through the centers of gravity of the patterns, the refractive index R1 of the patterns and the refractive index R2 of the zones between patterns are passed successively.

FIG. 3 shows the transition zone between two sub-gratings SR1 and SR2 on the surface of a substrate. Three blocks 8, 9, 10 of the sub-grating SR1 are seen that are indeed identical. On the other hand, the distance between neighboring blocks (and therefore between the centers of gravity of neighboring blocks) varies. Three blocks 11, 12, 13 of the sub-grating SR2 will be seen that are identical to each other. Here also, the distance between centers of gravity of neighboring blocks varies. What is understood by the distance between neighboring blocks is indicated by Db as an example for two blocks of the sub-grating SR2.

The invention claimed is:

1. A transparent substrate comprising:
    at a surface of the substrate, a grating of parallel lines of patterns separated by zones with a refractive index different from that of the patterns, the grating diffusing light and comprising at least 4 sub-gratings, each sub-grating comprising:
    a plurality of blocks of identical patterns with a width L, each block comprising 2 to 10 of the identical patterns, centers of gravity of neighboring identical patterns inside a block being separated by a constant period p, distance Db between neighboring blocks varying in a non-monotonic manner when passing from a first edge of the sub-grating to a second edge of the sub-grating, while being greater than 0 times L and less than 20 times L, and so that the distance Db is at least once greater than 1.2 $Db_m$ and at least once less than 0.7 $Db_m$, $Db_m$ being an arithmetic mean of distances between blocks of the sub-grating, and
    the period p varying from one sub-grating to another in a non-monotonic manner between 0.5 $p_m$ and 1.5 $p_m$ when passing from a first edge of the grating to a second edge of the grating, $p_m$ being an arithmetic mean of periods p characteristic of the sub-gratings, and so that at least one sub-grating has a period greater than 1.2 $p_m$ and that at least one sub-grating has a period less than 0.8 $p_m$.

2. The substrate as claimed in claim 1, wherein at least 80% or at least 90% of the identical patterns of a sub-grating form part of the blocks.

3. The substrate as claimed in claim 1, wherein at least 80% or at least 90% of the patterns of the grating form part of the blocks.

4. The substrate as claimed in claim 1, wherein each sub-grating comprises at least 4 blocks.

5. The substrate as claimed in claim 4, wherein each sub-grating comprises 100 to 5000 blocks.

6. The substrate as claimed in claim 1, wherein the grating comprises between 10 and 1000 sub-gratings.

7. The substrate as claimed in claim 1, wherein more than 25% of the sub-gratings have a period p less than 1.2 $p_m$ and more than 25% of the sub-gratings have a period p less than 0.8 $p_m$.

8. The substrate as claimed in claim 1, wherein more than 25% of the distances between neighboring blocks inside a sub-grating are greater than 1.2 $Db_m$ and more than 25% of the distances between neighboring blocks are less than 0.7 $Db_m$.

9. The substrate as claimed in claim 1, wherein any block inside a sub-grating comprises 2 to 10 of the identical patterns.

10. The substrate as claimed in claim 1, wherein the distance between the centers of gravity of the neighboring identical patterns is between 100 nm and 20 μm.

11. The substrate as claimed in claim 1, wherein for all the sub-gratings $p_m$ is between 300 nm and 500 nm.

12. A window comprising a substrate of claim 1.

13. A building comprising a window as claimed in claim 12, the window being vertical and exposed to sunlight.

14. The building as claimed in claim 13, situated in a terrestrial latitude such that the sun's rays form an angle of incidence with a horizontal plane greater than 30°, at least partially during the year.

15. The substrate as claimed in claim 1, wherein the substrate redirects sunlight toward a ceiling.

* * * * *